(12) United States Patent
Nelson (10) Patent No.: US 10,351,454 B2
(45) Date of Patent: Jul. 16, 2019

(54) MINING APPARATUS WITH WATER RECLAMATION SYSTEM

(71) Applicant: Mineworx Technologies Ltd., Burnaby (CA)

(72) Inventor: Duane Nelson, North Vancouver (CA)

(73) Assignee: Mineworx Technologies Ltd., Burnaby (CA)

( * ) Notice: Subject to any disclaimer, the term of this patent is extended or adjusted under 35 U.S.C. 154(b) by 872 days.

(21) Appl. No.: 13/894,893

(22) Filed: May 15, 2013

(65) Prior Publication Data

US 2014/0339173 A1 Nov. 20, 2014

(51) Int. Cl.

| | |
|---|---|
| C02F 9/00 | (2006.01) |
| C02F 1/38 | (2006.01) |
| C22B 1/00 | (2006.01) |
| B03B 7/00 | (2006.01) |
| C02F 1/00 | (2006.01) |
| C02F 1/52 | (2006.01) |
| C02F 11/122 | (2019.01) |
| C02F 103/10 | (2006.01) |
| C02F 103/16 | (2006.01) |

(52) U.S. Cl.
CPC .............. *C02F 9/00* (2013.01); *B03B 7/00* (2013.01); *C02F 1/38* (2013.01); *C22B 1/00* (2013.01); *C02F 1/004* (2013.01); *C02F 1/385* (2013.01); *C02F 1/52* (2013.01); *C02F 1/5281* (2013.01); *C02F 11/122* (2013.01); *C02F 2103/10* (2013.01); *C02F 2103/16* (2013.01); *C02F 2201/008* (2013.01); *C02F 2209/11* (2013.01); *C02F 2301/08* (2013.01)

(58) Field of Classification Search
None
See application file for complete search history.

(56) References Cited

U.S. PATENT DOCUMENTS

| | | | |
|---|---|---|---|
| 3,493,266 A | | 2/1970 | Hazlitt et al. |
| 3,910,837 A | | 10/1975 | Good |
| 4,160,566 A | | 7/1979 | McGee et al. |
| 4,302,328 A | * | 11/1981 | Van Note ............... B01D 36/02 159/DIG. 13 |
| 4,339,043 A | | 7/1982 | Tice et al. |
| 4,491,279 A | | 1/1985 | Long et al. |
| 4,536,286 A | * | 8/1985 | Nugent ................. C02F 1/5281 175/206 |
| 4,553,443 A | * | 11/1985 | Rossfelder ............. B06B 1/161 173/147 |

(Continued)

*Primary Examiner* — Richard C Gurtowski
(74) *Attorney, Agent, or Firm* — Merchant & Gould P.C.

(57) ABSTRACT

A mining apparatus and method of its use are disclosed. The apparatus includes a heavy metals separating subsystem and a water recycling subsystem. The heavy metals separating subsystem includes one or more classifying screens positioned to receive raw mining material classify materials to a pre-determined size, a slurry tank receiving water and the classified materials, forming a slurry, and a heavy metals concentrating assembly configured to receive the slurry and separate heavy metals from the slurry. The water recycling subsystem is positioned to receive the tailings and separate the tailings into recyclable water and solid waste. The water recycling system is configured to route the recycled water into the heavy metals separating subsystem for reuse.

17 Claims, 6 Drawing Sheets

(56) References Cited

U.S. PATENT DOCUMENTS

| | | |
|---|---|---|
| 5,490,924 A | 2/1996 | Macia et al. |
| 5,844,564 A | 12/1998 | Bennis et al. |
| 8,137,550 B1 * | 3/2012 | Moe .................. C02F 1/38 |
| | | 175/206 |
| 8,267,335 B2 | 9/2012 | Liubakka et al. |
| 8,303,824 B2 | 11/2012 | Miller |
| 8,347,960 B2 | 1/2013 | Mothersbaugh et al. |
| 2002/0123844 A1 | 9/2002 | Valls |
| 2003/0225606 A1 | 12/2003 | Raghuraman et al. |
| 2005/0261841 A1 | 11/2005 | Shepard et al. |
| 2008/0015873 A1 | 1/2008 | Shostack et al. |
| 2009/0084545 A1 | 4/2009 | Banerjee et al. |
| 2011/0062085 A1 * | 3/2011 | Deville ............... C02F 1/705 |
| | | 210/719 |
| 2012/0095639 A1 | 4/2012 | Makela et al. |
| 2012/0292186 A1 | 11/2012 | Adamson |
| 2013/0075344 A1 | 3/2013 | Wade |
| 2013/0197737 A1 | 8/2013 | Malayappalayam Shanmugam et al. |
| 2014/0129479 A1 | 5/2014 | Warner et al. |

* cited by examiner

MINING APPARATUS WITH WATER RECLAMATION SYSTEM

BACKGROUND

Mining systems, and in particular mining systems designed for heavy or precious metals, generally include many large-scale systems and subsystems used to classify and process various sediment types, thereby extracting the heavy or previous metals from sediment. Such mining systems generally require use of a substantial amount of water with which sediments are separated from heavy or previous metals. This water is generally retrieved from a nearby water source, such as a lake or river. Once used in the heavy metal extraction process, the now sediment-filled water is stored in settlement pools near the mining operation, which allow the sediments discarded as part of the mining process to separate from the water. Once the sediments and water separate, the water can then be returned to the water source.

These existing mining systems have numerous drawbacks. First, such a system can be difficult to transport, particularly to a location which is not readily accessible by heavy machinery. Second, such a system generally requires a large environmental footprint. That is both because of the size of the equipment used as well as the size of the sediment pools required to allow for settlement of sediments out of the water. Furthermore, such systems require a large volume of water to perform the heavy metal extraction process.

The above disadvantages of existing mining systems lead them to be unsuitable for use in many locations. For example, in particularly arid conditions, there may be only a limited water source, which is otherwise incapable of providing sufficient water for mining operations. Furthermore, in part due to the environmental impact of existing mining operations, many states, such as Nevada, California, and Arizona, as well as other international jurisdictions, restrict mining operations in particular areas (or overall). For example, many states are trying to mitigate potential environmental damage done by large mining equipment and potential groundwater contamination from large sediment pools and the protection of fish habitats due to suspended particulate in streams and rivers, and to conserve water. Accordingly, areas exist which may have substantial or economic heavy or precious metal deposits, but are unavailable for mining purposes due to difficulty in transporting mining equipment, lack of a convenient water source, or environmental regulations restricting the footprint of a mining operation.

It is with respect to this general environment that the embodiments of the present application are directed.

SUMMARY

In summary, the present disclosure relates to a mining apparatus with an integrated water reclamation system, as well as a process for its use. In some of the various embodiments discussed herein, the mining apparatus can be transported to and used in remote locations where transport, water supply, or environmental restrictions would otherwise prohibit mining operations, since many of the impacts of such typical mining operations are avoided.

In a first aspect, a mining apparatus includes a heavy metals separating subsystem. The heavy metals separating subsystem includes a classifying screen positioned to receive raw mining material and sized to separate particles above a predetermined size from classified materials. The heavy metals separating subsystem also includes a slurry tank receiving water and the classified materials, forming a slurry, and a heavy metals concentrating assembly configured to receive the slurry and separate heavy metals from the slurry. The mining apparatus also includes a water recycling subsystem positioned to receive the tailings and separate the tailings into recyclable water and solid waste. In some cases, the water recycling system is also configured to provide a secondary heavy metals separation with a centrifugal filtration system.

In a second aspect, a method of mining for heavy metals is disclosed. The method includes receiving raw mining materials at a mining apparatus, and classifying the raw mining materials to obtain classified materials below a predetermined size. The method further includes the fluidization of the material by mixing with water to form a slurry of the classified materials. This slurry is subsequently pumped through hydroclones to reduce the solids by weight and then into a gravimetric separator to separate the slurry into heavy metals and tailings. The method includes routing of the tailings through a hydrocyclone and one or more screens, to dewater to separate the solids from the tailings. The method further includes routing the tailings water to one or more mixing tanks to combine the tailings water with a clarifying agent, and into one or more clarification tanks to further separate suspended solids from the tailings water to produce clarified waste water and solid wastes. The method also includes the further filtering of the clarified waste water, and re-introducing the filtered waste water into the mining apparatus for reuse In some cases, the remaining suspended solids from the clarifiers are pumped through a filter press for the further extraction of water producing an almost dry filter cake.

In a third aspect, a portable mining apparatus includes a heavy metals separating subsystem mounted to a portable trailer. The heavy metals separating subsystem includes a hopper to receive the material to premix with water, a heavy metal pre-separation device, a rotating trommel for fluidization and pre-classification, and a classifying screen positioned to receive pre-classified mining material and sized to separate oversize particles from classified materials below a predetermined size, and a slurry tank receiving water and the classified materials, forming a slurry. The heavy metals separating subsystem also includes a heavy metals concentrating assembly configured to receive the slurry and separate heavy metals from the slurry and ejecting the remainder of material as waste tailings. The apparatus also includes one or more waste tanks positioned to receive the waste tailings. The apparatus further includes a water recycling subsystem mounted on a portable trailer to receive the contents of the one or more waste tailings tanks and separate the contents into recyclable water and solid waste. The water recycling subsystem includes one or more mixing tanks receiving the contents of the one or more waste tanks, and a clarifier positioned to add a clarifying agent to the one or more mixing tanks to assist in separating the contents of the one or more mixing tanks into clarified waste water and solid wastes. The water recycling subsystem also includes a filter press receiving settled waste water from one or more mixing tanks receiving settled waste water from the one or more waste tanks and separating the settled waste water into water and dry waste, and one or more balance tanks receiving the water from the filter press and the clarified waste water, the one or more balance tanks fluidically connected to a disk filter and cooperating with the disk filter to provide filtered water that is reintroduced into the heavy metals separating subsystem.

DETAILED DESCRIPTION

As briefly described above, embodiments of the present invention are directed to a mining apparatus with an integrated water reclamation system, as well as a process for its use. In the various embodiments discussed herein, the portable mining apparatus can be transported to and used in remote locations where transport, water supply, or environmental restrictions would otherwise prohibit mining operations, since many of the impacts of such typical mining operations are avoided.

Figure 1:
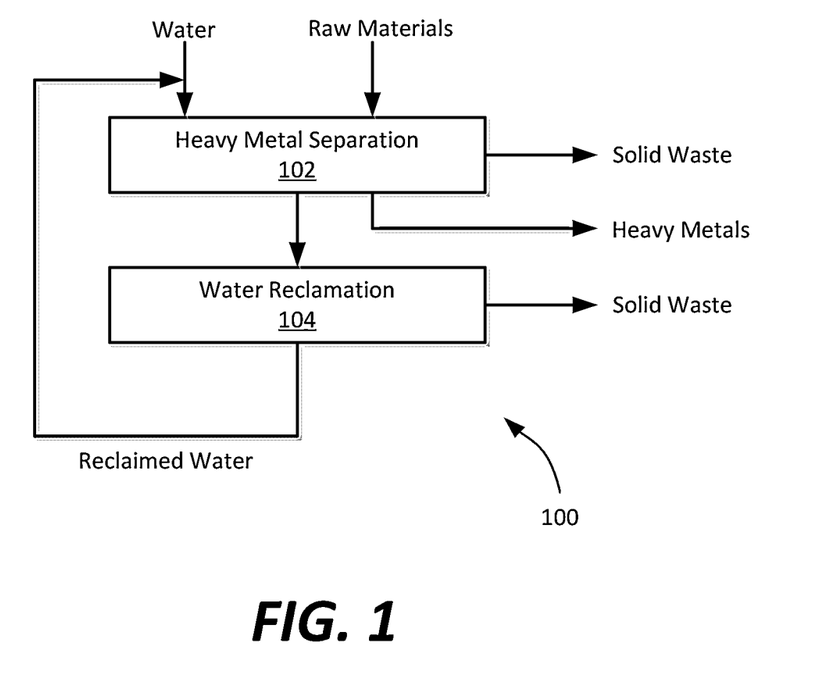
FIG. 1 is a general-purpose block diagram of a portable mining apparatus according to an example embodiment of the present disclosure.

In accordance with the present disclosure, a general block diagram of an example portable mining apparatus 100 is illustrated in FIG. 1. As illustrated, the portable mining apparatus 100 generally includes a heavy metals separating subsystem 102 and a water reclamation subsystem 104. The heavy metals separating subsystem 102 generally receives raw mining materials as well as water from a water supply, and includes one or more components useable to separate heavy or precious metals from the raw mining materials, for example using systems including water. In particular, the heavy metals separating subsystem 102 can be configured to extract any of a variety of types of desirable heavy metals, including previous heavy metals such as gold or silver. In particular, in the embodiment shown, the heavy metals separating subsystem 102 outputs solid waste and heavy metals as well as a waste water and tailings mixture. Traditionally, such a mixture would be stored in settling ponds, allowing the sediment to precipitate out of the water prior to re-introducing the water back to the water source for the overall mining apparatus.

The heavy metals separating subsystem 102 is, in some embodiments, configured to be mountable to a vehicle-portable platform, such as a flatbed trailer capable of being towed by a vehicle to a mining site. One example of such a subsystem is illustrated in FIG. 2A, below, with a layout of components of such a subsystem illustrated in FIG. 5, below.

The water reclamation subsystem 104 is configured to be integrated with the heavy metals separating subsystem 102, and generally designed to receive tailings and waste water that would otherwise be placed into settling ponds to allow separation of sediments from water. The water reclamation subsystem 104 instead receives the tailings and waste water for treatment, and processes the tailings and waste water to allow for reuse of water within the heavy metals separating subsystem 102. In example embodiments, the water reclamation subsystem 104 is also portable, and mountable to a vehicle-portable platform (the same platform or a different one from the heavy metals separating subsystem 102). Furthermore, the water reclamation subsystem 104 can include various components including separators, filters, and/or clarifying processes, for separating reclaimed water from solid waste removed from the tailings and waste water. One example of such a subsystem is illustrated in FIG. 2B, below.

Figure 2A:
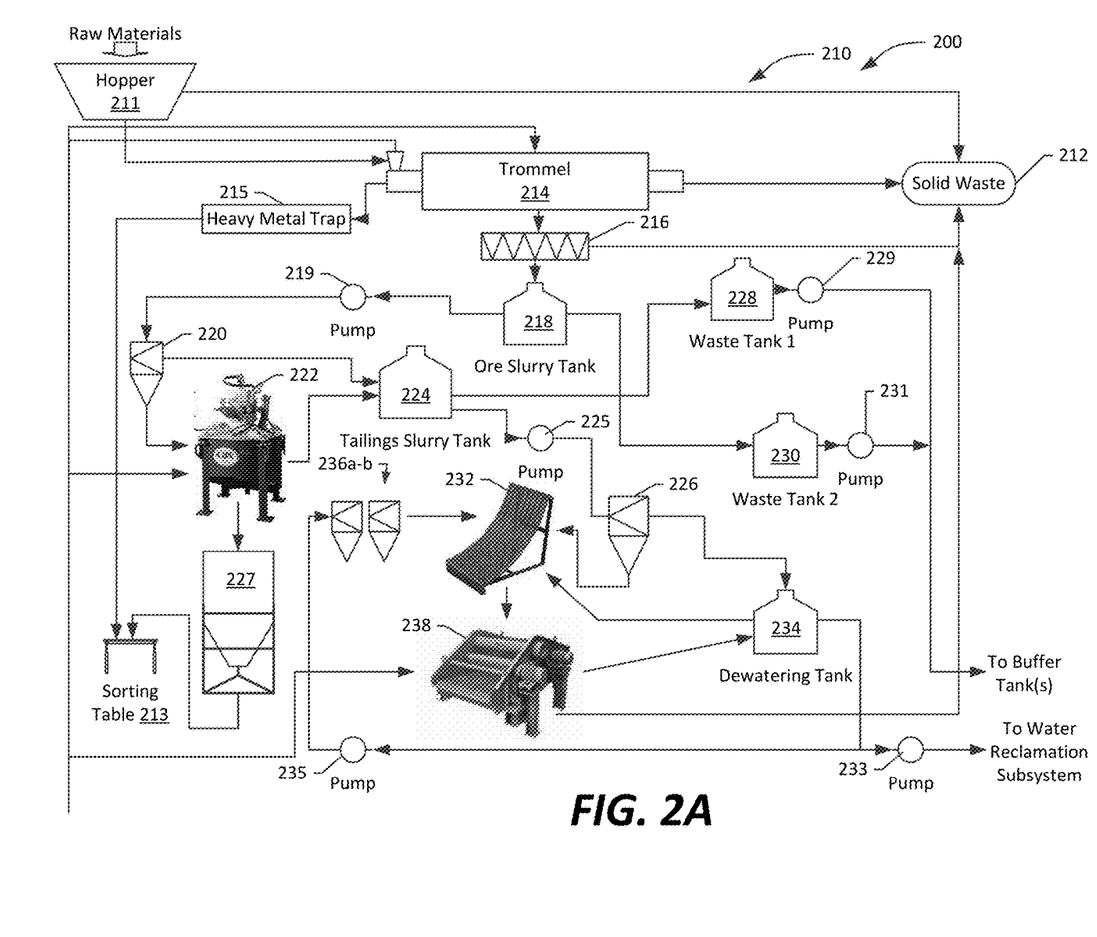
FIG. 2A is a logical diagram illustrating a portable mining apparatus according to an example embodiment of the present disclosure.
Figure 2B:
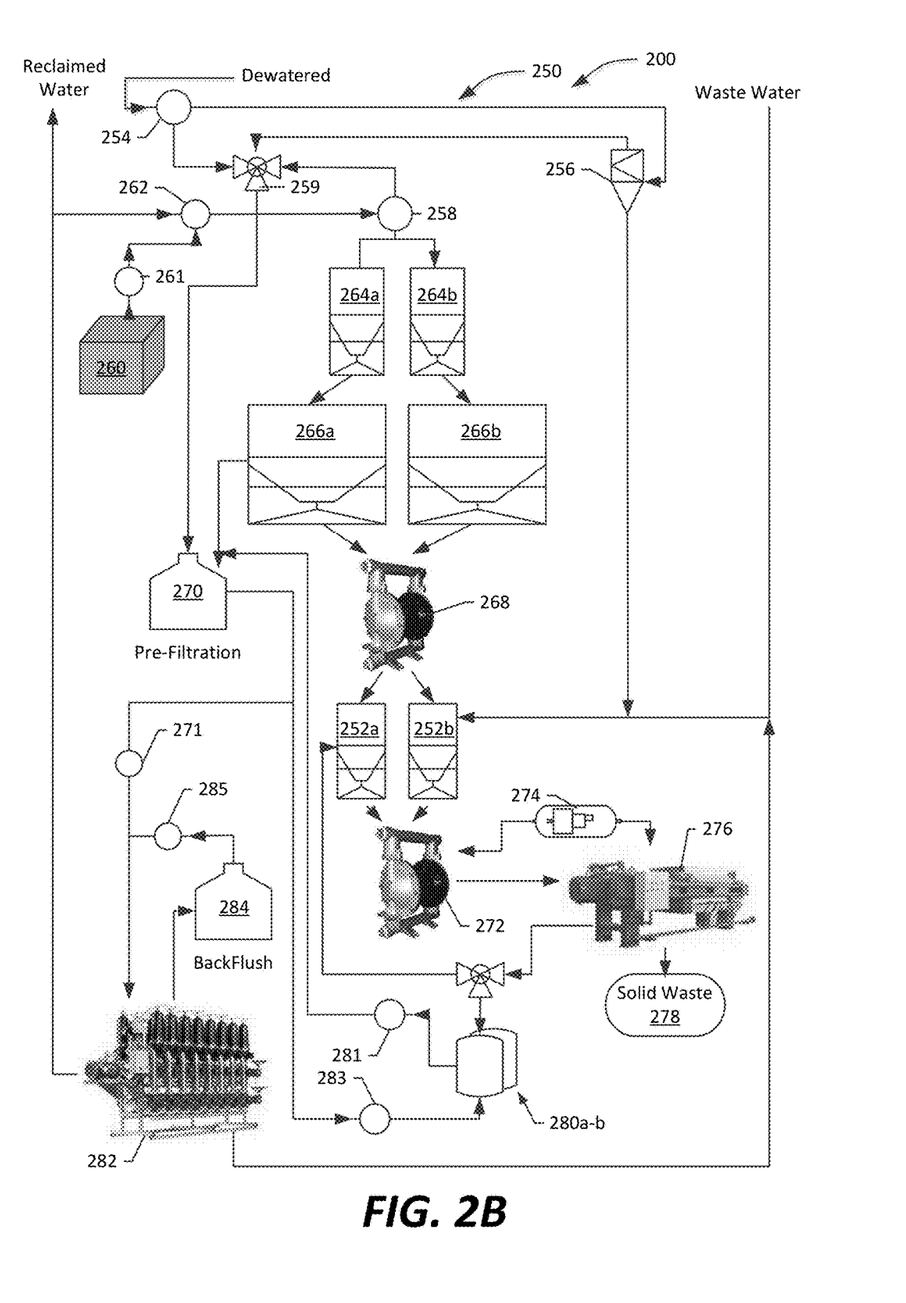
FIG. 2B is a logical diagram illustrating a portable mining apparatus according to an example embodiment of the present disclosure.

Referring now to FIGS. 2A-2B, a logical diagram illustrating a portable mining apparatus 200 is illustrated, according to a particular embodiment of the present disclosure. The portable mining apparatus 200 as shown can be, in some embodiments, a particular implementation of the apparatus 100 of FIG. 1. FIG. 2A illustrates a possible embodiment of a heavy metals separating subsystem 210, which can represent a possible arrangement of the heavy metals separating subsystem 102 of FIG. 1, while FIG. 2B illustrates a possible embodiment of a water reclamation subsystem 250, which can represent a possible arrangement of the water reclamation subsystem 104 of FIG. 1.

Referring to FIG. 2A specifically, the heavy metals separating subsystem 210 receives, in the embodiment shown, raw mining materials can first be classified using a grizzly (not shown) to arrive at mining particles below a first predetermined size, such as 1-3 inches in diameter. The mining materials below this size can be placed into a hopper 211. At the hopper 211, water is introduced to fluidize the mining materials. In an example embodiment, the mining materials can be routed to the hopper at a relatively high rate; for example, in a particular embodiment, the hopper can accept 20 tons per hour of raw mining materials, as well as 100 gallons of water per minute to fluidize the raw mining materials. From the hopper, materials larger than the predetermined size are discarded to a solid waste pile 212.

Materials from the hopper 211 are passed to a fluidizing trommel 214, which receives water from either a water source (not shown), or from a water reclamation subsystem, such a subsystem 250 discussed below and shown in FIG. 2B. The fluidizing trommel 214 receives additional water, for example a constant flow of about 80 gallons per minute, to assist in separating materials. The fluidizing trommel 214 separates the raw mining materials in a variety of ways. Solid waste, corresponding to materials greater than a second, smaller diameter (e.g., about 10-13 mm) is routed to a solid waste pile 212. Oversized heavy metals, caught by an oversize heavy metal trap 215, are caught and routed to a sorting table 213, such as a "gold table". Additionally, materials smaller than the second diameter are routed to a classifying screen 216.

At the classifying screen 216, still further separation of materials according to size is performed. For example, the classifying screen can separate materials greater than about 2 mm in diameter to be routed to the solid waste pile 212, while allowing smaller materials to pass into an ore slurry tank 218. The classifying screen 216 receives additional water to assist in the classification, but generally requires less water than the fluidizing trommel 214, for example about 10 gallons per minute, to form the slurry passing into the ore slurry tank 218.

From the ore slurry tank 218, a pump 219 routes a slurry at a high rate of throughput to a hydrocyclone 220, which increases the volume by weight of suspended particulate matter. The underflow from the hydrocyclone 220 is routed to a gravimetric separator 222, while the overflow is passed to a tailings tank 224. The gravimetric separator 222 receives the output of the hydrocyclone 220, as well as additional water, and extracts heavy metals from the slurry, passing the extracted heavy metals to a heavy metals concentration tank 227, and to the sorting table 213. Tailings from the gravimetric separator 222 are passed into the tailings tank 224.

From the tailings tank 224, a pump 225 routes tailings to a further hydrocyclone 226, while additional or overflow tailings are routed to a waste tank 228. Likewise, and referring back to the ore slurry tank 218, overflow from that tank can be routed to a waste tank 230 as well. The waste tanks 228, 230 are emptied by pumps 229, 231, respectively to one or more buffer tanks included in a water reclamation subsystem 250 of FIG. 2B, discussed below. Meanwhile the hydrocyclone 226 is used to again increase volume by weight of suspended particulate, prior to passing the tailings through a parabolic screen 232, and overflow to a dewatering tank 234. The parabolic screen 232 may also receive tailings from additional hydrocyclones 236a-b, and the tailings are pumped via pump 235 from the dewatering tank 234. A further dewatering vibrating screen 238 receives the output of the parabolic screen 232, and, when additional spray water is applied, separates tailings from solid waste, which is routed to the solid waste pile 212. Additionally, the dewatering tank 234 receives the output of the dewatering vibrating screen 238, thereby forming a cycle of water continuously screening and routing tailings to the dewatering tank 232. A pump 233 routes the screened tailings to a water reclamation subsystem 250.

Referring to FIG. 2A overall, it is noted that the heavy metals separating subsystem 210 includes a number of components requiring a water source. In the context of the present disclosure, the heavy metals separating subsystem 210 can use a stand-alone water source in conjunction with a water reclamation subsystem, or can alternatively operate for at least some time using the water reclamation subsystem alone. As seen in FIG. 2B, the water reclamation subsystem 250 receives waste water (including tailings, etc. from the waste tanks 228, 230 at buffer tanks 252a-b, and also receives water from a dewatering tank 232 at a turbidity meter 254. The turbidity meter 254 routes the water either to a centrifugal filter 256, and self-cleaning disc filters or sends the waste water to a flocculent injector 258 via a three-way valve 259. The flocculant injector 258 receives a flocculant from a clarifying system 260, which transmits a flocculant (clarifying agent) via a flocculant metering pump 261 and a mixer 262, which mixes the flocculant with cleaned water. In an example embodiment, the clarifying system is a flocculant application system made by Kemira Oyj of Helsinki, Finland. Other types of clarifying systems could be used as well.

The water and flocculant is then passed to one or more mixer tanks 264a-b, which can include, in some embodiments, a slow mixer tank and a fast mixer tank. The mixer tanks are then routed to holding (or clarification) tanks 266a-b, which hold the mixed sediment filled water and flocculant, until separation of sediments and water can occur. The sediments are then passed to the buffer tanks 252a-b, while the clarified water is passed via pump 268 to a pre-filtration tank 270. In the embodiment shown, each of the buffer tanks are sized to hold at least about 350 gallons, while the mixer tanks hold at least about 250 gallons. The holding tanks 266a-b are substantially larger, at about 1625 gallons each, which is an adequate amount of water to allow for settling to occur.

From the buffer tanks 252a-b, a waste pump 272, for example an air diaphragm pump powered by an air compressor 274, routes the waste to a filter press 276, which presses water out of settled solids, routing the solids to a solid waste collection 278. In the embodiment shown, the filter press compresses the waste, thereby extracting remaining water and outputting almost dry, solid bricks of sediment.

From the filter press 276, water is passed to balance tanks, 280a-b, which filter the extracted water, which is in turn pumped via pump 281 to the pre-filtration tank 270. In the embodiment shown, the balance tanks 280a-b are configured to hold and filter up to 1600 gallons of water; however, other capacities could be used as well. A pump 271 routes the clarified and/or filtered water to a disk filter system 282. The disk filter system 282 separates water from waste water, routing the waste water back to the buffer tanks 252a-b, and providing the water to the heavy metals separating subsystem 210 of FIG. 2A. In an example embodiment, the disk filter system 282 is a filter made by Arkal Filtration Systems of Jordan Valley, Israel. Other embodiments could use other types of filter systems as well.

In the embodiment shown, a backflush tank 284 and backflush pump 285 can be used to clean the disk filter system 282 when it becomes clogged. In the example embodiment shown, the backflush tank 284 is sized to hold about 150 gallons, although in other embodiments other sizes of tanks could be used. Additionally, one or more balance pumps, such as pump 283, can be included in the system to balance the throughput of the system.

It is noted that, although particular components are discussed above in connection with FIGS. 2A-2B, other components or configurations of a heavy metals separating subsystem 210 and a water reclamation subsystem 250 could be used. As such, the arrangement illustrated herein is intended as exemplary, rather than limiting.

Figure 3:
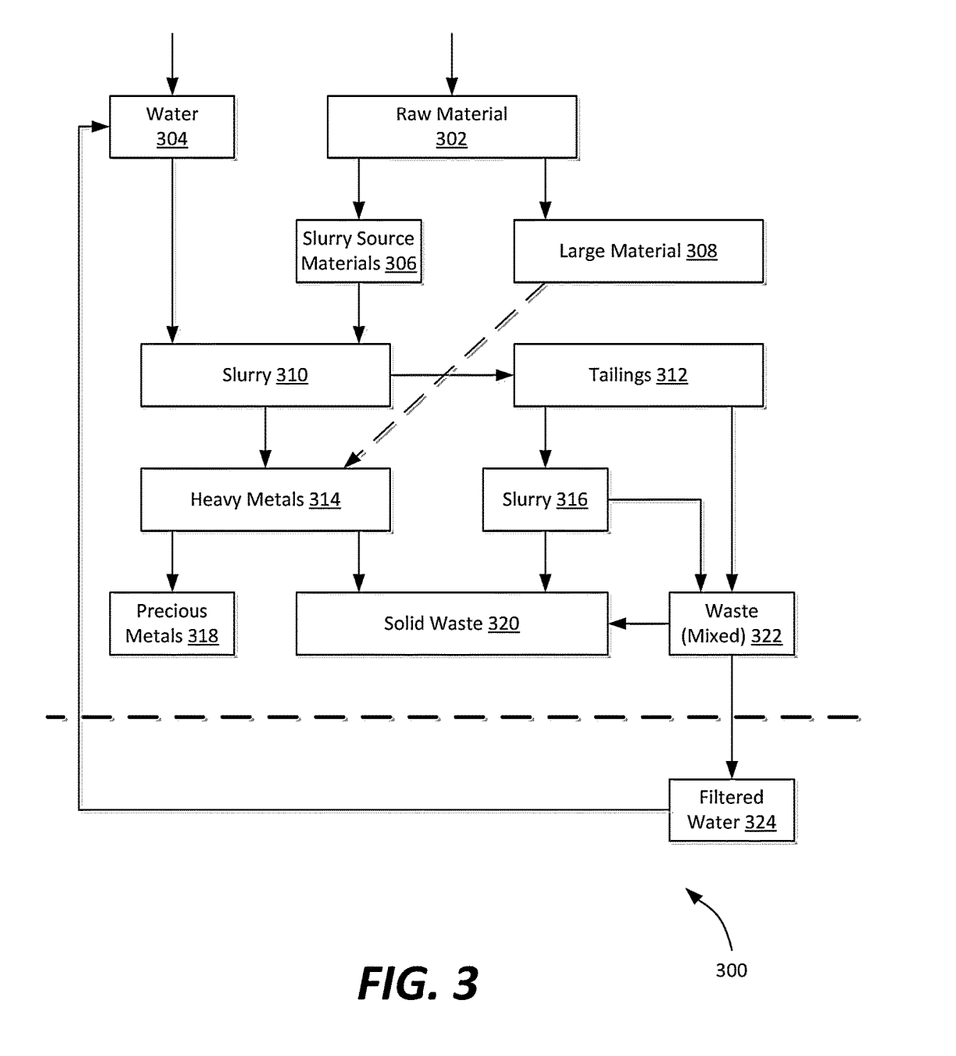
FIG. 3 is a block diagram illustrating a general progression of mining materials and water through a portable mining apparatus.

Referring now to FIG. 3, an example transformation 300 of raw materials and water in a portable mining apparatus according to the present disclosure is shown. The transformation 300 can occur, for example based on use of a portable mining apparatus, such as apparatus 100, 200 of FIGS. 1 and 2A-2B.

In the embodiment shown, raw materials 302 and water are provided to a portable mining apparatus, and large material 308 is separated from slurry source materials 306 which are raw materials below a predetermined size. This separation can occur using any of a variety of types of separating screens, trommels, or other categorization mechanisms. The water and slurry source materials are added to a slurry 310, which is then processed via hydrocyclones and/or gravimetric separators or other equipment such that heavy metals 314 are separated 312. The tailings are reintroduced into a slurry 316.

The heavy metals 314 are inspected and separated into precious metals 318 (e.g., gold, silver, or other heavy metals of value) and solid waste 320. This can occur, for example, via use of a sorting table or similar arrangement. Similarly, the slurry can be separated into solid waste 320 and waste water 322. The waste water can segmented, for example using additional sorting screens, into further solid waste 320 and waste water. The waste water is then passed to a water reclamation subsystem, which applies clarifying agents and filters to reclaim useable water.

Figure 4:
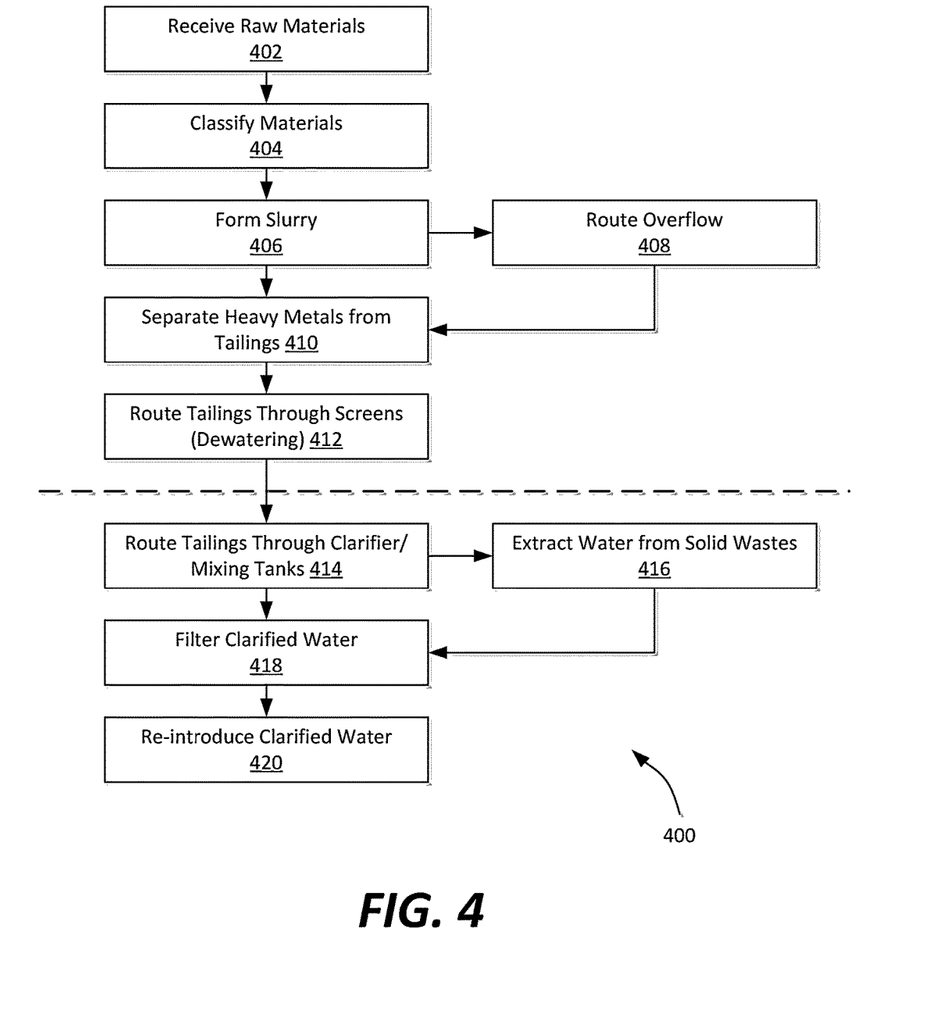
FIG. 4 is a flowchart illustrating a method of mining for heavy metals, according to an example embodiment.

Referring now to FIG. 4, a flowchart illustrating a method 400 of mining for heavy metals is shown, according to an example embodiment. The method 400 generally corresponds to the steps performed to transform the materials as illustrated in FIG. 3, and can be performed, for example, using any of the apparatus described above in FIGS. 1-2, or analogous systems. The method 400 can be performed at least in part by a user of such apparatus, or by control systems incorporated with such apparatus. The method 400 includes receiving raw materials at operation 402, and classifying those materials at operation 404. The classifying can occur based on any predetermine size, for example using one or more screening processes to remove large scale particles. A slurry is formed at operation 406, and overflow of the slurry is routed to a holding tank at operation 408. Heavy metals are then separated from the tailings at operation 410, for example using a gravimetric separator and/or a sorting table. The tailings are then passed through screens as part of a dewatering operation 412.

The water used during operations 402-412 is next reclaimed for reuse, for example by routing the tailings through a series of screens and hydrocyclones and then a clarification process. The tailings generally are then separated and solid wastes are extracted. One or more filters can be used to filter the clarified water separated from the solid wastes at operation 418, and the clarified and filtered water is then re-introduced into the slurry for use in processing of subsequent raw mining materials.

It is noted that, although the general operational steps are depicted in FIG. 4, additional steps could be included in alternative processes, and that alternative equipment could be used to that discussed herein, in a manner consistent with the present disclosure.

Figure 5:
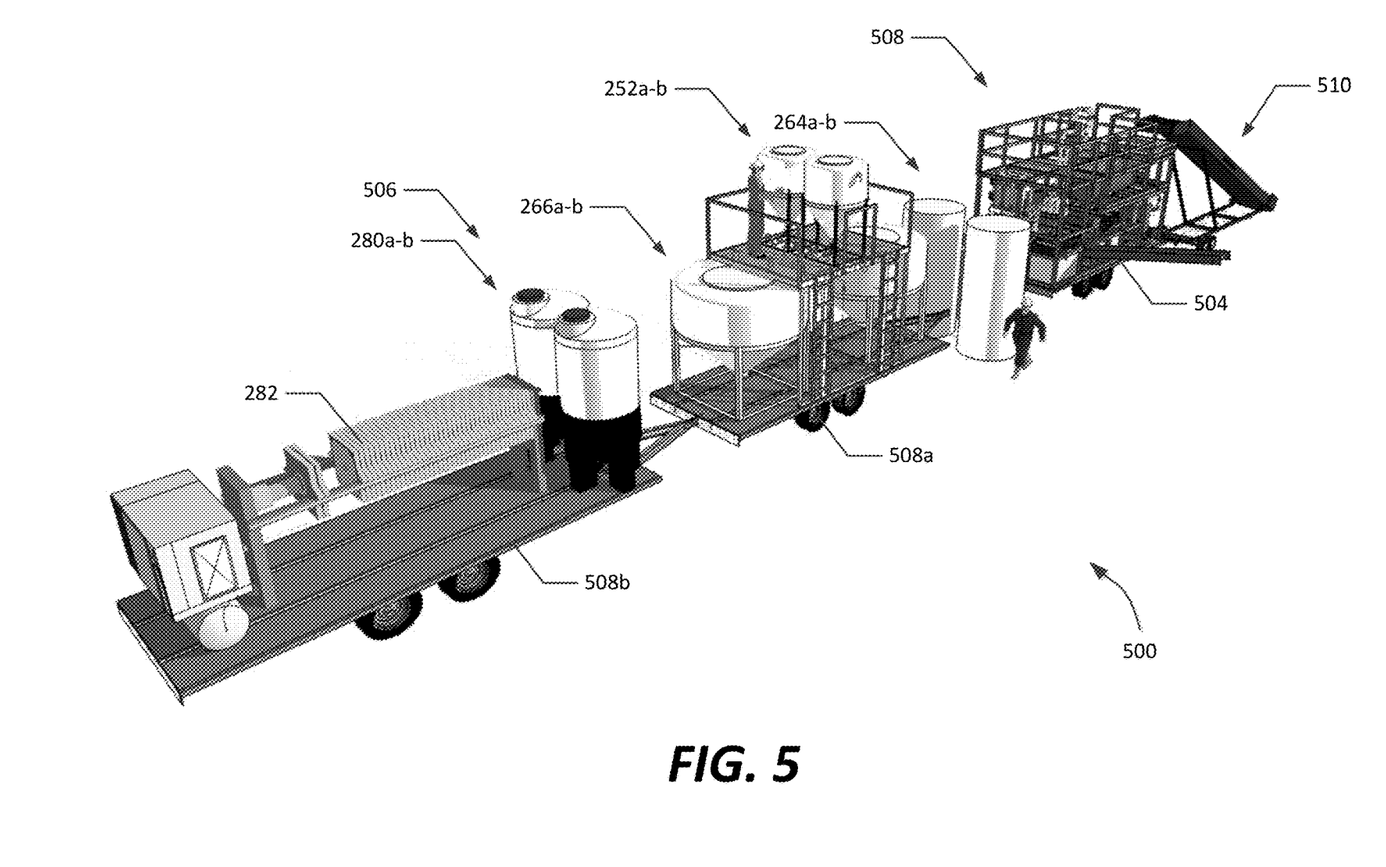
FIG. 5 is a perspective view of an example portable mining apparatus illustrating a possible layout of mining equipment on a vehicle-portable platform, according to one possible embodiment.

Referring now to FIG. 5, a perspective view of an example portable mining apparatus 500 is shown. The portable mining apparatus 500 can, in some embodiments, correspond to the apparatus 200 of FIGS. 2A-2B, when that apparatus is used in a portable arrangement.

In the embodiment shown, the portable mining apparatus 500 generally includes a heavy metal extraction subsystem 502 mounted at least in part to a vehicle-transportable surface, such as a flatbed trailer 504 or shipping container. The portable mining apparatus 500 also includes a water reclamation subsystem 506 mounted at least in part to one or more vehicle-transportable surface, such as a flatbed trailers 508*a-b*. In example embodiments, one or more components of the heavy metal extraction subsystem 502 and the water reclamation subsystem 506 can be located on the same or different trailers or surfaces. Furthermore, although in the embodiment shown three flatbed trailers are shown, more or fewer could be used, or could be stacked in shipping containers or other transportation methods could be used.

In the specific example embodiment shown, select aspects of a portable mining apparatus such as are shown in FIGS. 2A-2B are included in the portable mining apparatus 500. In particular, flatbed trailer 508*b* includes a disk filter system 282 as well as balance tanks 280*a-b*. Flatbed trailer 508*a* includes the buffer tanks 252*a-b*, as well as holding tanks 266*a-b*. Mixer tanks 264*a-b* are shown as located to receive water from the heavy metal extraction subsystem 502 on flatbed trailer 504, which can include component analogous to those illustrated in FIG. 2A. A raw materials elevator 510 can also be included for ease of delivery of materials to the heavy metal extraction subsystem 502.

Referring to the portable mining apparatus 500 generally, it is noted that various other arrangements of the components of FIGS. 2A-2B, or other components in different embodiments, could be placed in different configurations on one or more portable surfaces to allow for convenient transport of the mining apparatus to a mining site. Furthermore, and referring to FIGS. 1-5 generally, it is noted that one example benefit of the disclosed methods and systems over conventional mining operations is the ability to effectively extract heavy metals from the earth without harming the surrounding environment with any dangerous chemicals or solvents, and diminishing the surface disturbance and ground water contamination with the elimination or reduction of tailings containment areas or settling ponds.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the claimed invention and the general inventive concept embodied in this application that do not depart from the broader scope.

The invention claimed is:

1. A mining apparatus comprising:
a heavy metals separating subsystem configured to separate precious heavy metals from raw mining material, the heavy metals separating subsystem including:
one or more classifying screens positioned to receive raw mining material and sized to separate particles above a predetermined size to produce classified mining materials;
a slurry tank receiving water and the classified mining materials, forming a slurry;
a heavy metals concentrating assembly configured to receive the slurry and separate precious heavy metals from the slurry, the heavy metals concentrating assembly including at least one separator having a precious heavy metals collection output and a tailings output, the tailings output including water and solid waste;
a water recycling subsystem positioned to receive tailings from the tailings output and separate the tailings into recyclable water and solid waste;
wherein the water recycling subsystem is configured to route the recyclable water into the heavy metals separating subsystem for reuse.

2. The mining apparatus of claim 1, wherein the heavy metals separating subsystem is mounted to a vehicle-portable platform including at least one portable trailer sized for transport.

3. The mining apparatus of claim 2, wherein the water recycling subsystem is mounted on at least one surface carried by the at least one portable trailer.

4. The mining apparatus of claim 3, wherein the at least one portable trailer comprises a flatbed trailer, and wherein the at least one surface comprises a container.

5. The mining apparatus of claim 1, wherein the heavy metals separating subsystem includes a trommel positioned to fluidize and deliver a portion of the raw mining material to the classifying screen.

6. The mining apparatus of claim 5, wherein the trommel includes a heavy metal trap.

7. The mining apparatus of claim 1, wherein the at least one separator includes at least one gravimetric separation device.

8. The mining apparatus of claim 1, wherein the heavy metals concentrating assembly includes a precious heavy metals concentrate tank and a sorting table.

9. The mining apparatus of claim 1, further comprising one or more waste tanks positioned to receive waste material as slurry from the heavy metals concentrating assembly.

10. The mining apparatus of claim 9, wherein the water recycling subsystem includes a dewatering subsystem and a wastewater filtration subsystem.

11. The mining apparatus of claim 10, wherein the wastewater filtration subsystem includes a filter press receiving settled waste water from one or more mixing tanks receiving waste water from the one or more waste tanks and extracting solid wastes from the waste water.

12. The mining apparatus of claim 11, wherein the wastewater filtration subsystem includes one or more balance tanks receiving clarified water from the one or more mixing tanks.

13. The mining apparatus of claim 11, wherein the wastewater filtration subsystem routes the waste water to a secondary precious heavy metals separating subsystem.

14. The mining apparatus of claim 12, wherein the wastewater filtration subsystem further includes a clarifier positioned to add a clarifying agent to the one or more mixing tanks to assist in separating suspended particulate from the waste water.

15. A portable mining apparatus comprising:
a heavy metals separating subsystem mounted to a portable trailer, the heavy metals separating subsystem configured to separate precious heavy metals from raw mining material, the heavy metals separating subsystem including:
  a classifying screen positioned to receive raw mining material and sized to separate waste particles to produce classified mining materials below a predetermined size;
  a slurry tank receiving water and the classified mining materials, forming a slurry;
  a heavy metals concentrating assembly configured to receive the slurry and separate precious heavy metals from tailings, the heavy metals concentrating assembly including at least one separator having a precious heavy metals collection output and a tailings output, the tailings output including water and solid waste;
one or more waste tanks positioned to receive waste water from the slurry tank and tailings from the tailings output;
a water recycling subsystem mounted on a portable trailer to receive the contents of the one or more waste tanks and separate the contents into recyclable water and solid waste, the water recycling subsystem including:
  one or more mixing tanks receiving the contents of the one or more waste tanks;
  a clarifier positioned to add a clarifying agent to the one or more mixing tanks to assist in separating the contents of the one or more mixing tanks into clarified waste water and settled waste water;
  a filter press receiving the settled waste water from one or more mixing tanks and separating the settled waste water into water and dry waste;
  one or more balance tanks receiving the water from the filter press and the clarified waste water, the one or more balance tanks fluidically connected to a disk filter and cooperating with the disk filter to provide filtered water that is reintroduced into the heavy metals separating subsystem.

16. The mining apparatus of claim 1, wherein the heavy metals separating subsystem further includes a sorting table, the sorting table receiving the precious heavy metals collection output.

17. The portable mining apparatus of claim 15, wherein the heavy metals separating subsystem further includes a sorting table, the sorting table receiving the precious heavy metals collection output.

* * * * *